Patented Jan. 28, 1930

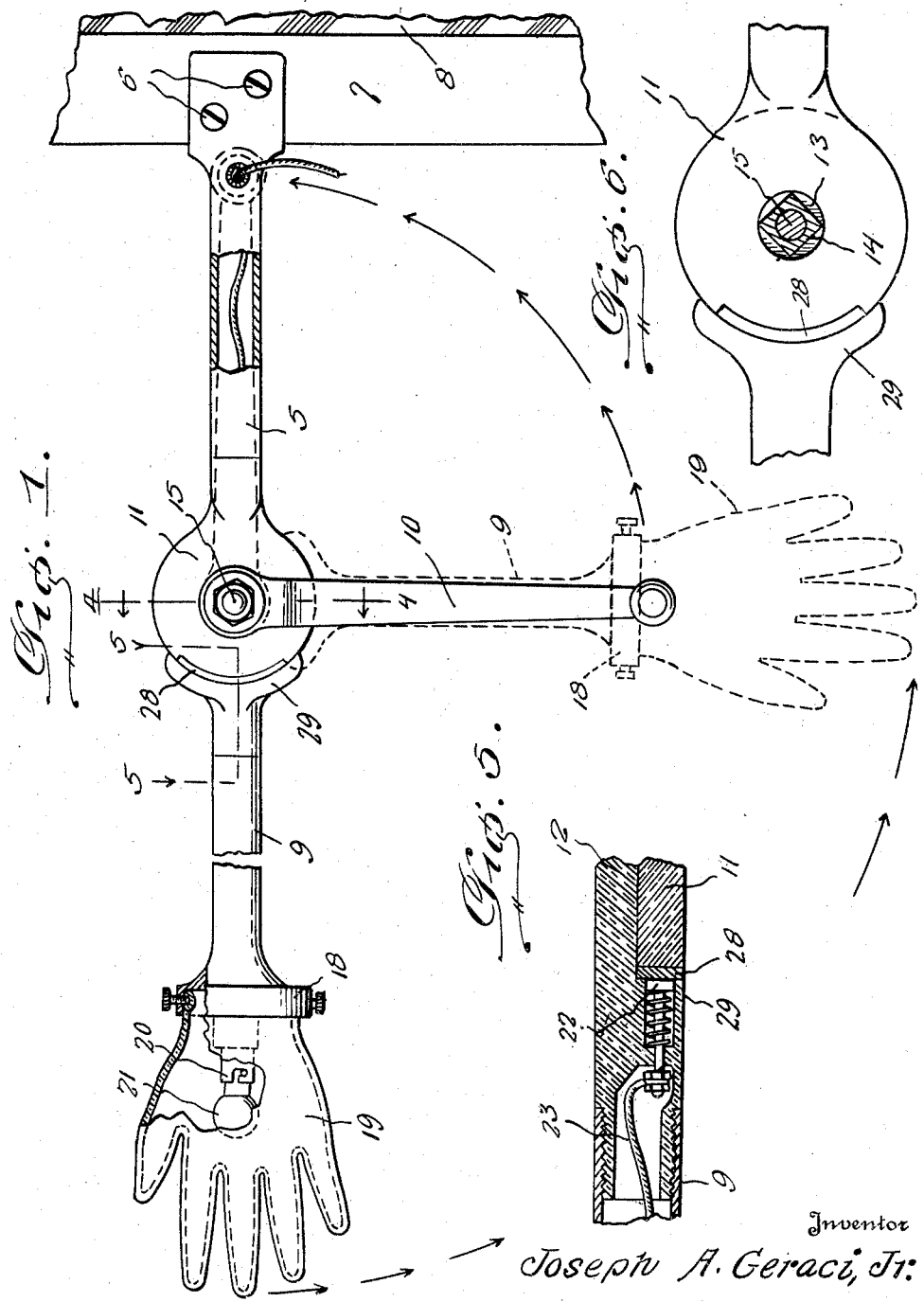

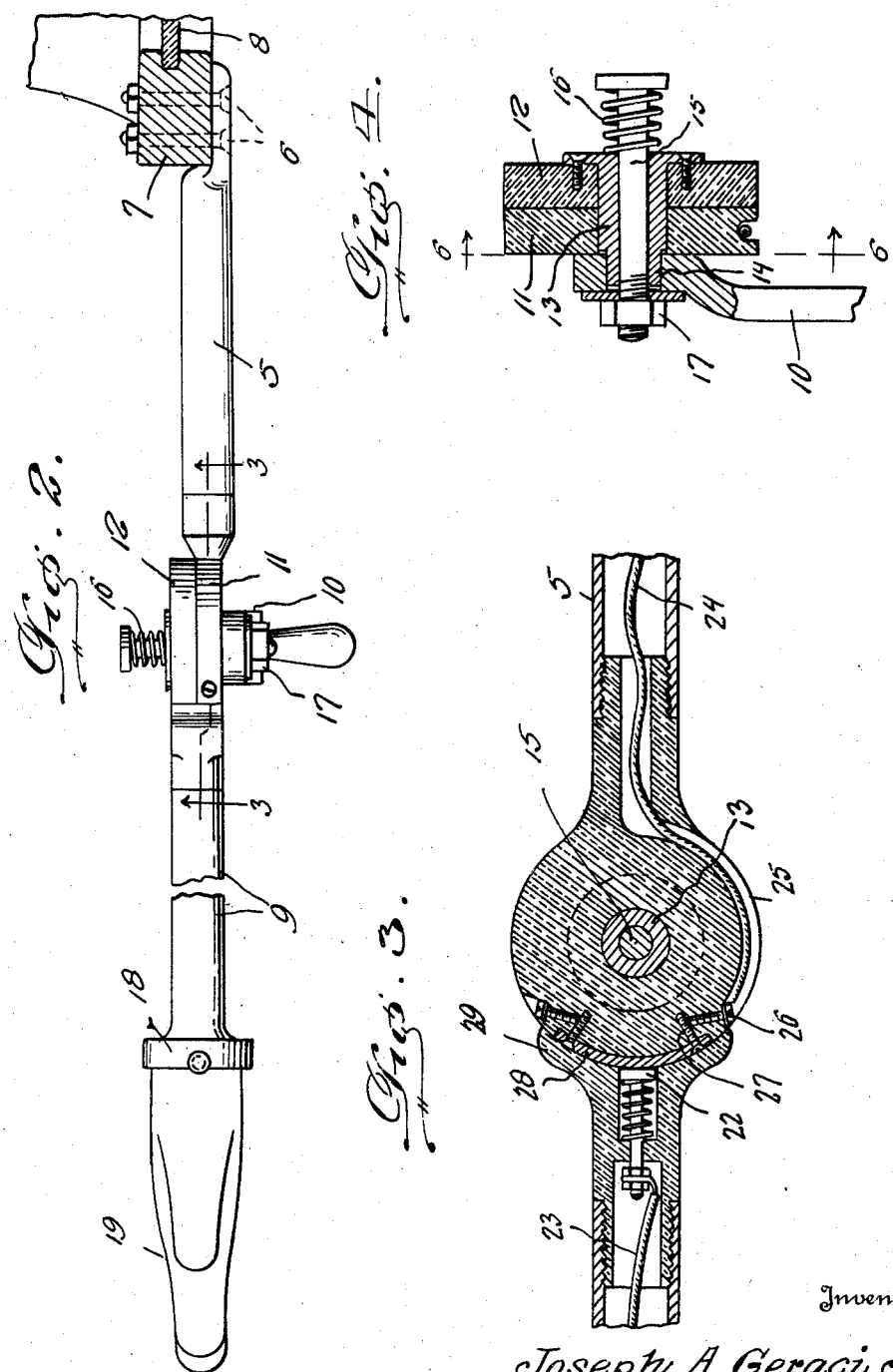

1,745,091

UNITED STATES PATENT OFFICE

JOSEPH A. GERACI, JR., OF SAN JOSE, CALIFORNIA, ASSIGNOR OF ONE-HALF TO SALVATORE CAMPAGNA, JR., OF SAN JOSE, CALIFORNIA

MOTION AND DIRECTION SIGNAL

Application filed December 6, 1927. Serial No. 238,047.

This invention relates to motion and direction signals for motor vehicles, and has more particular reference to an improved signal of this kind embodying a vertically swinging signal arm adapted to be mounted at the side of a vehicle and to be manually raised from a lowered inoperative vertical position to various signalling positions, whereby to warn pedestrians and drivers of other vehicles of the intention of the driver of said vehicle to stop or change the course of travel of the latter.

The primary object of the present invention is to provide a signal of the above kind which is simple and durable in construction and efficient and reliable in operation.

A further important object is to provide a signal of the above kind having simple and efficient means whereby the signal arm is illuminated when raised to operative positions so as to be readily discerned at night, and whereby illumination is discontinued when the signal arm is lowered to its inoperative position.

Other objects and advantages will become apparent as the nature of the invention is better understood, and the same consists in the novel form, combination and arrangement of parts hereinafter more fully described, shown in the accompanying drawings and claimed.

In the drawings:

Figure 1 is a side elevational view, partly broken away and in section, of a signal embodying the present invention, and illustrating the signal mounted on the windshield frame of a motor vehicle.

Figure 2 is a top plan view thereof.

Figure 3 is an enlarged fragmentary longitudinal section on line 3—3 of Figure 2.

Figure 4 is an enlarged vertical transverse section on line 4—4 of Figure 1.

Figure 5 is an enlarged fragmentary section on line 5—5 of Figure 1, and

Figure 6 is a fragmentary section on line 6—6 of Figure 4.

Referring more in detail to the drawings, the present signal comprises a bracket arm 5 adapted to be suitably rigidly secured at one end, as at 6, to the side frame member 7 of the motor vehicle windshield 8 or to the side of the vehicle body, and having one end of a signal arm 9 pivoted to the outer end thereof so as to permit said signal arm to swing vertically, suitable means, such as a handle 10, being provided to facilitate manual operation of the signal arm from the driver's seat of the vehicle.

As shown, the adjacent ends of the bracket and signal arms are provided with flat disk-like hinge members 11 and 12 disposed in side by side contiguous relation and pivotally connected by means of a hollow shaft 13 fixed to the hinge member 12 and journaled in the hinge member 11, the handle 10 being fitted on the projecting polygonal end 14 of shaft 13 whereby said handle may be operated to turn the latter shaft and swing the signal arm vertically. The handle 10 is held on shaft 13, and the hinge members are yieldingly held in frictional engagement, by means of a bolt 15 passing through the shaft 13, and a compression spring 16 encircling the bolt 15 between its head and the adjacent outer side of hinge member 12, a nut 17 being threaded on the bolt 15 at the outer side of handle 10 to hold the parts assembled. By reason of the frictional engagement of the hinge members 11 and 12, the signal arm will remain or be held in the various positions to which it is swung, and rattling of the parts will be prevented.

The outer end of signal arm 9 is provided with a holder 18 to receive and retain the open base of a transparent globe 19 in the form of a hand, and mounted in this holder is a socket 20 for reception of an incandescent electric lamp 21 arranged within and adapted to illuminate the hand of the signal arm.

The bracket and signal arms are hollow, and extending in the signal arm from a spring-pressed contact 22 at the inner end of said latter arm to a terminal of lamp socket 20 is a conductor wire 23, while extending into the inner end of bracket arm 5 is a conductor wire 24 which passes out through the outer end of said bracket arm and in a peripheral groove 25 of hinge member 11 to a terminal screw 26 which is threaded into the member 11 to engage one of a pair of screws 27 which secure an arcuate contact plate 28 to the periphery of member 11 in position to have the contact 22 ride onto and off of the same. The contact plate 28 is disposed so that contact 22 will ride off of the same when the signal arm is lowered to a vertical inoperative position as indicated by dotted lines in Figure 1, but so that contact 20 will be in engagement therewith when the signal arm is raised to outwardly and downwardly inclined, outwardly and upwardly inclined and horizontal positions to respectively denote a left turn, a right turn and stop. Thus, the signal arm will be illuminated when in any of these signalling positions if conductor wire 24 is connected to a source of electricity such as the usual battery provided on a motor vehicle, the current being returned to the battery by suitable means, such as a ground wire extending from the other terminal of lamp socket 20.

The signal arm 9 has a curved member 29 at one side of and concentric with the axis of hinge member 12, arranged to ride upon the periphery of hinge member 11 and through the arcuate face of which the contact 22 is exposed to engage contact plate 28.

From the foregoing description, it will be seen that I have provided a simple and durable signal which may be cheaply manufactured and assembled as well as readily placed into practical use, and which may be quickly manipulated in the manner described to give the warnings desired. It will also be seen that illumination of the signal arm will be had when moved to operative position so that the latter may be readily discerned at night, the construction being compact and of such a nature as to minimize liability of short-circuiting and damaging the conductor wires.

Minor changes may be made without departing from the spirit and scope of the invention as claimed.

What I claim as new is:

1. In a motion and direction signal of the class described, a tubular bracket arm of hollow form having one end flattened to provide an attaching head having its opposite end internally screw-threaded, a disk-like hinge member having an extension on its periphery forming a connector, said connector being of hollow construction and externally screw-threaded and tapped into the screw-threaded end of said bracket arm, a complemental disk-like hinge member disposed in frictional contact with said first-named hinge member and pivotally connected thereto, and an outstanding hollow tubular connector, a hollow signal arm separably connected with said last-named connector and provided on its outer end with a signal indicator.

2. In a motion and direction signal of the class described, a bracket arm, a signal arm, and a signal carried by said arm, and a special hinge connection between the inner end of said arms comprising a relatively stationary disk-like member provided with a central opening and provided with a peripheral extension forming a bracket arm connector, a relatively movable disk-like member in frictional contact with said first-named member embodying a peripheral enlargement designed to provide an arcuate shoe and an outstanding signal arm connector, said second-named member being provided with a central opening in registry with the opening in the first-named member, a tubular shaft fastened to the first-named member end extending through and beyond the second-named member and terminating in a polygonal end, a crank handle removably fastened to said polygonal end, and a spring-pressed pin passing through said tubular shaft and provided with a nut-retained washer cooperable with said crank handle to hold the crank handle in place and yieldably maintain the members in movable contact with each other.

In testimony whereof I affix my signature.

JOSEPH A. GERACI, Jr.